US00RE34846E

United States Patent [19]

McGuire

[11] E Patent Number: Re. 34,846

[45] Reissued Date of Patent: Feb. 7, 1995

[54] LIQUID RETAINING TRAY FOR CASKET

[75] Inventor: Keith D. McGuire, Batesville, Ind.

[73] Assignee: Batesville Casket Company, Batesville, Ind.

[21] Appl. No.: 198,885

[22] Filed: Feb. 18, 1994

Related U.S. Patent Documents

Reissue of:

[64] Patent No.: 5,092,060
Issued: Mar. 3, 1992
Appl. No.: 592,203
Filed: Oct. 3, 1990

[51] Int. Cl.[6] ..... A61G 17/04
[52] U.S. Cl. ..... 27/19; 27/2
[58] Field of Search ..... 27/2, 19

[56] References Cited

U.S. PATENT DOCUMENTS

| | | | |
|---|---|---|---|
| 58,756 | 2/1866 | Scollay | 27/3 |
| 675,679 | 6/1901 | Shaw | 27/3 |
| 1,261,707 | 4/1918 | Cook | 27/3 |
| 2,247,617 | 7/1941 | Metz | 27/3 |
| 2,882,584 | 4/1959 | Kidd | 27/3 |
| 3,435,494 | 4/1969 | Bernard | 27/3 |
| 3,488,818 | 1/1970 | Orr . | |
| 3,964,140 | 6/1979 | Gauchard | 27/3 |
| 4,448,826 | 5/1984 | Davidian . | |
| 4,780,940 | 11/1988 | Jay . | |
| 4,827,581 | 5/1989 | Davidian | 27/3 |
| 4,949,439 | 8/1990 | Semon | 27/19 |
| 4,951,367 | 8/1990 | Wolfe | 27/19 |

FOREIGN PATENT DOCUMENTS

| | | | |
|---|---|---|---|
| 1151167 | 1/1958 | France | 27/19 |
| 2532544 | 3/1984 | France | 27/19 |
| 2538698 | 7/1984 | France . | |
| 2590796 | 12/1985 | France . | |
| 2626245 | 7/1989 | France | 27/19 |
| 197811 | 11/1978 | Germany | 27/19 |
| 2719154 | 11/1978 | Germany | 27/19 |
| 2206334 | 1/1989 | United Kingdom . | |

*Primary Examiner*—Carl D. Friedman
*Assistant Examiner*—Beth A. Aubrey
*Attorney, Agent, or Firm*—Wood, Herron & Evans

[57] ABSTRACT

A tray with a bottom of a casket has a bottom wall, longitudinal side walls and transverse end walls that are interconnected to create a water-tight container. A network of upstanding ribs is formed on the bottom wall to create a plurality of discrete isolated compartments for the retention of liquids. The side walls and end walls have vertical, inwardly projecting ribs for stiffening purposes. The tray is preferably made by vacuum forming of a thermoplastic material such as high density polyethylene.

12 Claims, 3 Drawing Sheets

LIQUID RETAINING TRAY FOR CASKET

Matter enclosed in heavy brackets [ ] appears in the original patent but forms no part of this reissue specification; matter printed in italics indicates the additions made by reissue.

BACKGROUND OF THE INVENTION

This invention relates to a burial casket and more particularly to a tray placed in the bottom of a casket to capture liquids created by the decomposition of human remains.

Decomposition of human remains, even if embalmed, creates fluids that accumulate in the bottom of a casket. These fluids present a number of problems. For example, due to the use of formalin solution in embalming, there can be the presence of extremely corrosive formic acid in the fluids, as well as other corrosive materials. Bacteria, enzymes etc. also are present in the fluids. Formic acid is extremely corrosive to metals, e.g. carbon steel, stainless steel, copper and its alloys, presenting the risk of casket failure and leakage due to corrosion.

Wooden caskets, because of the inherent nature of the material and methods of construction, are not leak proof. Fluids which accumulate can readily escape to the outside creating problems of leakage before interment and also for interment in mausoleums and crypts.

Prior dealings with the problem have been more or less jury rigged solutions. Funeral directors might put absorbent material in the bottom of the casket. A sheet of plastic may have been stapled to the interior of the bottom portion of the casket. A tray containing ice cubes to keep the body cool has been proposed in U.S. Pat. No. 1,261,707. A tray that slides horizontally into the casket has been proposed, although the function of the tray does not appear to be the capture of liquids, in U.S. Pat. No. 2,882,584.

SUMMARY OF THE PRESENT INVENTION

An objective of the invention has been to provide an improved tray for installation into the bottom of a casket. The attributes of the improved tray include the following:

1) it is waterproof and leakproof;
2) it is immune to corrosion—specifically to formic acid and all other fluids found in caskets;
3) it is unaffected by bacteria and their metabolites;
4) it is crematable—in wood and metal caskets;
5) it is lightweight;
6) it can be shaped to be easily "dropped into the casket";
7) it does not decrease the usable interior space in the casket;
8) it allows full operation of the casket lift/tilt mechanism;
9) it has smooth sides and surface and can be colored to have an attractive or unobvious presence;
10) it has a ribbed configuration for stiffness so that the sides do not deflect—allowing a thin wall part for acceptable economics and conformance to internal irregularities of casket interiors;
11) it has a "snap in" feature that allows installation without any fasteners and it retains its position without moving or falling out during handling and shipping;

12) it can be made with material that is "self sealing" when or if fasteners need to penetrate the walls;
13) it is a seamless, one-piece liner;
14) it can be made to a variable depth—from completely reaching the upper edge of the casket shell to lower wall lengths for ease of installation and economy;
15) it can have "molded in" retainers for internal mechanical parts e.g., lift/tilt retainer brackets;
16) it is stackable for ease of shipment and handling;
17) it can have molded or built-in fastener mechanisms for simplified attachment of the fabric casket interior;
18) it can be made from heavy wall material to add mechanical strength to the bottom of the casket;
19) it can have indentations that avoid penetration by hardware attachment bolts, screws, etc.; and
20) it does not require fasteners to install or retain it in place;
21) it can be formed of recycled plastic materials.

This objective of the invention and its attributes are attained by providing a tray that covers the entire bottom of a casket. The tray is molded preferably of a vacuum-formed thermoplastic sheet of a thickness between about 0.020–0.125 inch. The tray has a network of interconnected upstanding ribs that create small discrete compartments for the entrapment and isolation of liquids. The height of the ribs in relation to the size of the compartments is such that when the bottom of the tray is covered by about 0.5 inch of liquid, the casket can be tilted at an angle of about 30° without the liquid flowing from one compartment into another. The side walls of the tray are about 6" high and have vertical ribs for stiffening purposes. While any one of the number of thermoplastic materials will perform satisfactorily, high density polyethylene is the preferred material. One of its attributes is that it will seal around a screw passing through the material and, thus, hardware can be mounted on the bottom of the casket by passing screws through the hardware and the tray before penetrating the body of the casket without losing the liquid-tight integrity of the tray.

The several features and objectives present invention will become more readily apparent from the following detailed description taken in conjunction with the accompanying drawings in which.

DETAILED DESCRIPTION OF THE DRAWINGS

Figure 1:
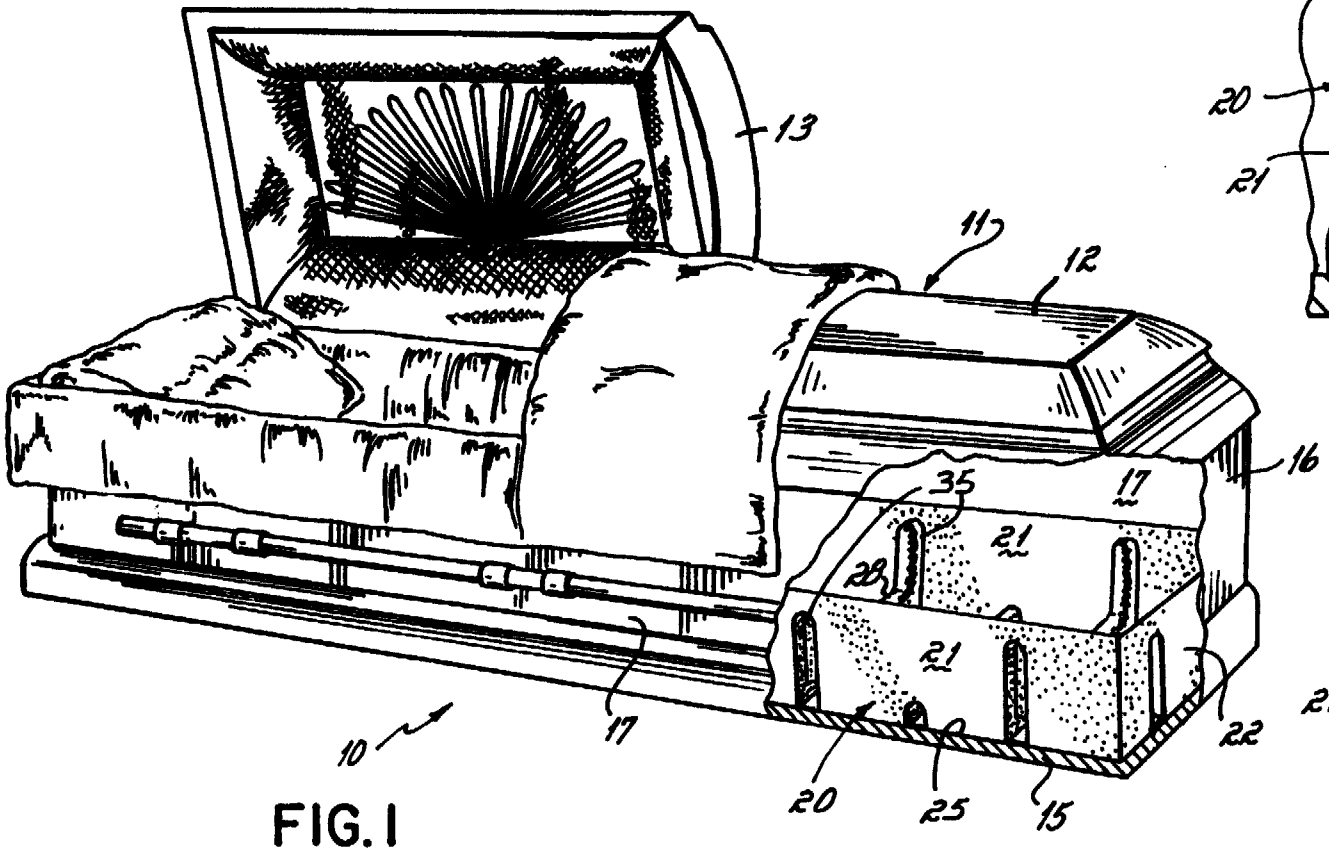
FIG. 1 is a perspective view of a casket with the walls partially broken away to show the tray in the interior of the casket.

Referring to FIG. 1, the casket 10 has a body and a top 11. The top is divided into a foot section 12 and head section 13. The interior of the casket has a bottom wall 15, end walls 16, and side walls 17.

A tray 20, in accordance with the present invention, is disposed in the interior of the casket. It covers the bottom wall 15. It has side walls 21 that engage the casket walls 17 and end walls 22 that engage the casket end walls 16. A representative size of the tray is 77" inches long, 22½" wide, and 6" deep.

Figure 2:
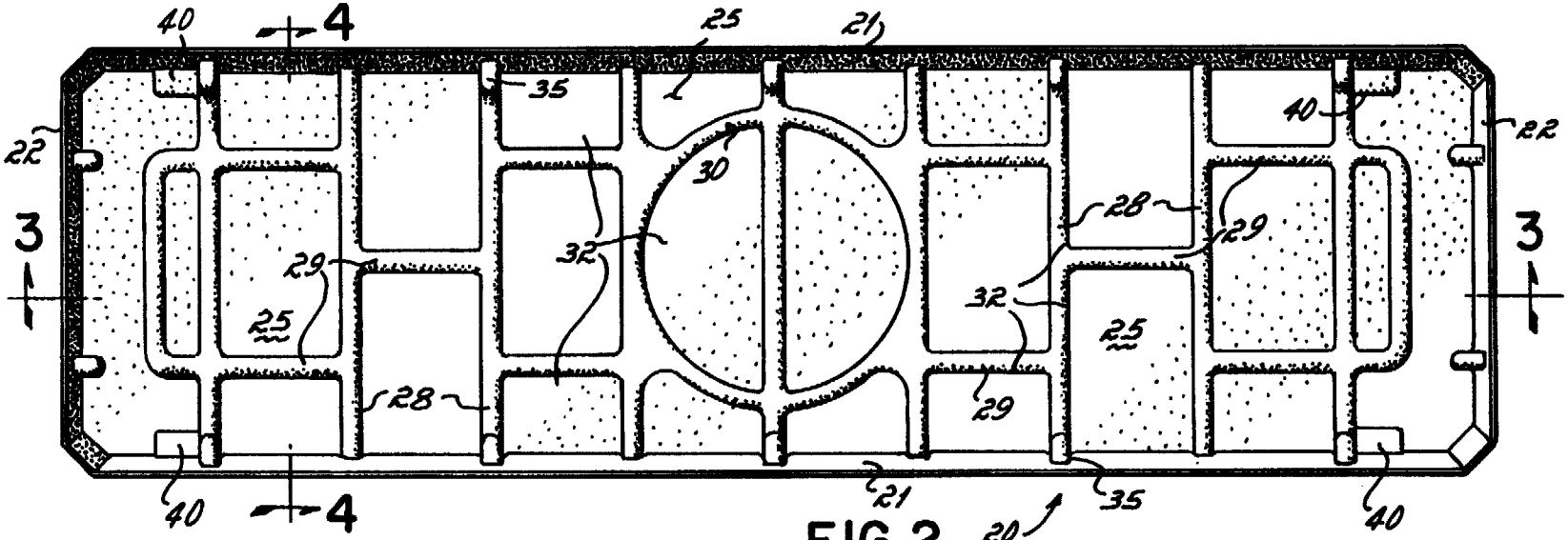
FIG. 2 is a top plan view of the tray in accordance with the invention.
Figure 3:
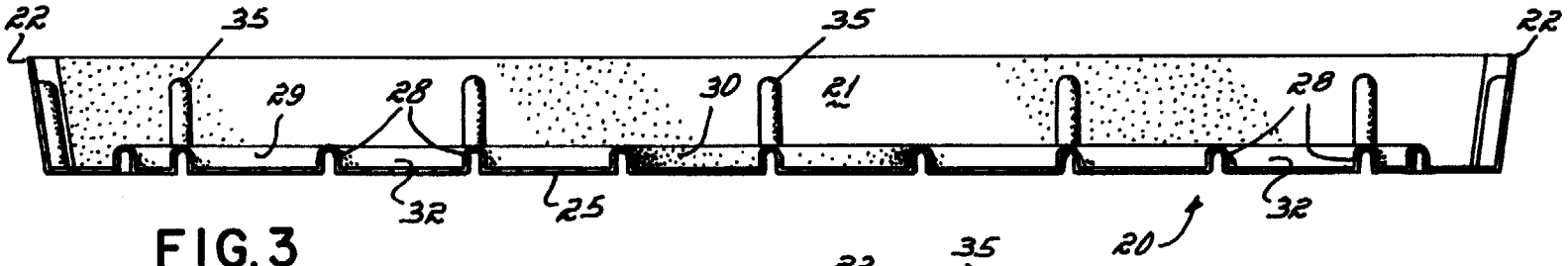
FIG. 3 is a cross-sectional view taken along line 3—3 of FIG. 2.
Figure 4:
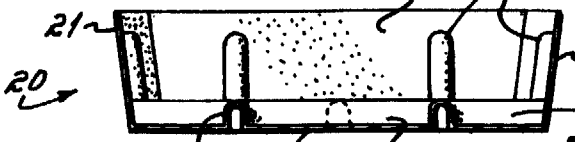
FIG. 4 is a cross-sectional view taken along line 4—4 of FIG. 2.

Referring now to FIGS. 2, 3 and 4, it can be seen that the tray has a bottom wall 25 that is integral with the side and end walls 21, 22. The tray is preferably vacuum-formed from a sheet of high density polyethylene whose thickness is in the range of 0.020–0.125 inch. In the vacuum forming, the bottom wall is laced with a network of transverse ribs 28, longitudinal ribs 29, and arcuate ribs 30. These ribs form discrete chambers or compartments 32. The ribs also strengthen the bottom wall. Preferably the ribs are about 1½" high as shown in FIG. 3. That height, combined with the rather small horizontal dimensions, preferably the longitudinal dimension of individual compartments, assures the retention of liquid within the compartment, even though the casket with its tray may be inclined to an angle of as great as 30°.

The side walls have vertical ribs 35 which provide for stiffening and prevent oil canning. It can be seen that the side walls and end walls are outwardly flaring, the preferred angle being about 7° to a vertical plane. The flaring side and end walls permit the trays to conveniently stacked within one another. Further, in assembly, the flaring walls permit the trays to be inserted easily into the casket and snapped into position at its bottom.

Figure 5:
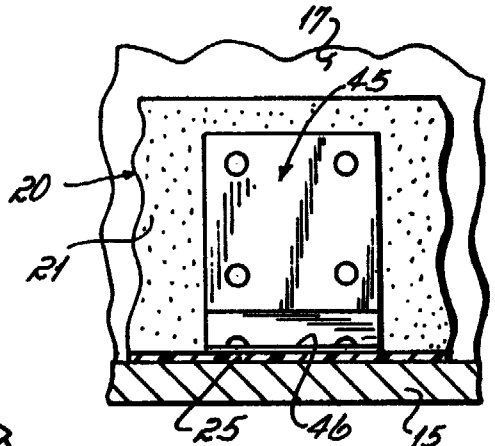
FIG. 5 is a fragmentary elevational view showing the mounting of a bracket in the casket.
Figure 6:
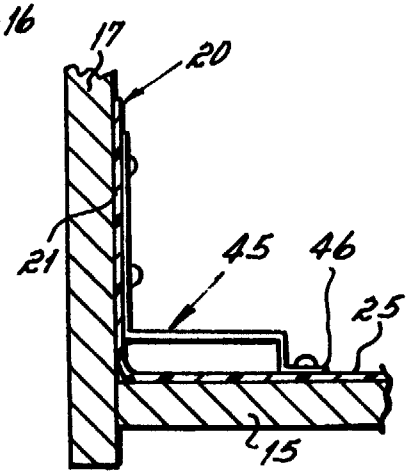
FIG. 6 is cross-sectional view taken along line 6—6 of FIG. 5.

A wide variety of hardware is required in the different types of caskets. The tray of the present invention lends itself to the utilization of such hardware in two respects. If the hardware projects into the casket from the bottom walls or side walls, the tray can be molded with recesses of any desired configuration such as illustrated at 40 in FIG. .3. Thus, the tray can accommodate itself to preinstalled hardware. The tray also lends itself to the post-installation mounting of hardware as illustrated in FIGS. 5 and 6. There, by way of example, is shown a bottom bracket 45 for a lift tilt mechanism (that being the mechanism that supports the bed of the casket and permits it to be raised and tilted. The bracket has a lower horizontal flange 46. The flange is secured to the casket bottom wall 15 by driving screws through the flange, the tray bottom wall and into the wooden casket bottom. The high density polyethylene of the tray acts like a sealing washer around the screws and prevents leaking of liquids through the tray via the holes created by the penetration of the tray by the screws.

Figure 8:
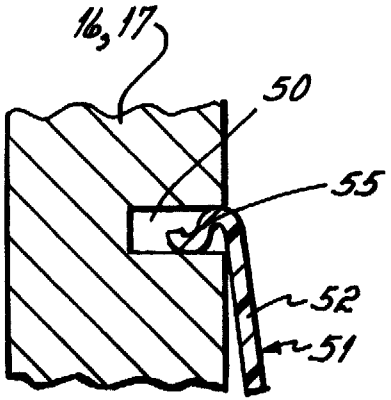
FIG. 8 is an enlarged view of the encircled area of FIG. 7.
Figure 7:
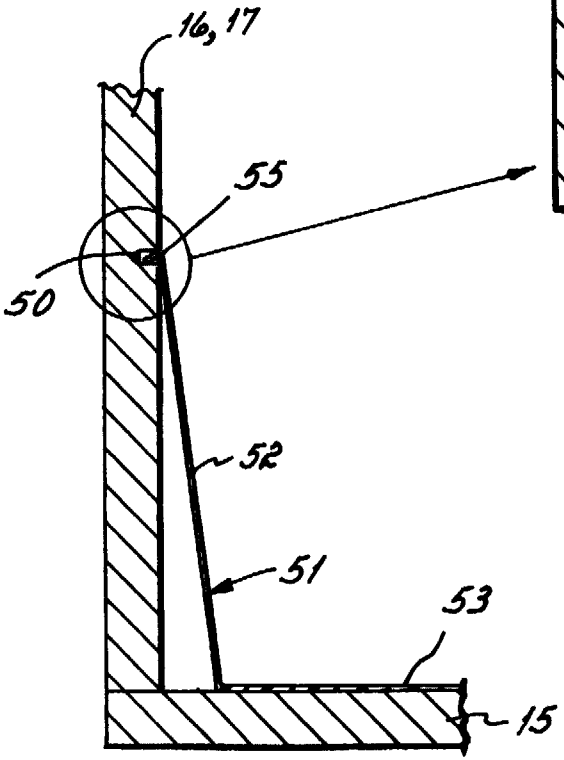
FIG. 7 is a fragmentary cross-sectional view of a corner of a casket showing an alternate embodiment.

An alternate embodiment of the invention is shown in FIGS. 7 and 8. In that embodiment, the casket vertical walls 16, 17 have a groove 50 extending around the interior of the casket parallel to the bottom wall 15. The tray 51 has vertical walls 52 extending upwardly from its bottom wall 53. The vertical walls are terminated in a laterally-projecting edge 53. As shown in FIGS. 7 and 8, that edge projects into the groove 50. In the assembly of the tray to the casket, the vertical walls will resiliently cause the projecting edge 55 to snap into the groove 50, thereby retaining the tray in the casket.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof.

I claim:

1. A tray for the bottom of a casket comprising;
a sheet of plastic material having a bottom wall
longitudinal side walls connected to said bottom wall and
transverse end walls connected to said bottom wall and said side walls,
said bottom wall having a network of interconnected upstanding ribs forming a plurality of discrete isolated compartments for the retention of liquids,
the longitudinal dimension of the compartments being so related to the height of the ribs to permit a casket to have one end raised up to about 3020 with respect to said other end without overflowing when the depth of liquid in a horizontal casket is about 0.5 inch.

2. A tray as in claim 1 in which said plastic sheet is in the range of about 0.020 to 0.125 inch thick.

3. A tray as in claim 2 in which said upstanding ribs are about 1.5 inches above said bottom wall.

4. A tray as in claim 2 in which said side and end walls are inclined outwardly about 7°.

5. A tray as in claim 2 in which said side and end walls have vertical ribs, projecting inwardly, that stiffen the walls while permitting conformance to internal irregularities of casket interiors.

6. A tray as in claim 2 in which said side and end walls are about six inches high.

7. A tray for the bottom of a casket comprising;
a sheet of plastic, high density, polyethylene material that is in the range of about 0.020 to 0.125 inch [think] *thick*, said material having a bottom wall;
*longitudinal side walls connected to said bottom wall, and*
integral transverse end walls connected to said bottom wall and said side walls,
said side and end walls being at least about six inches high,
said bottom wall having a network of interconnected upstanding ribs about 1.5 inches high forming a plurality of discrete isolated compartments for the retention of liquids,
the longitudinal dimension of the compartments being so related to the height of the ribs to permit a casket to have one end raised up to about 3020 with respect to said other end without overflowing when the depth of liquid in a horizontal casket is about 0.5 inch.

8. A tray as in claim 1 which is formed of recycled plastic materials.

*9. A tray for the bottom of a casket comprising a sheet of plastic material having:*
*a bottom wall,*
*longitudinal side walls connected to said bottom wall, and*
*transverse end walls connected to said bottom wall and said side walls,*

*said bottom wall having a plurality of interconnected upstanding ribs forming a plurality of discrete isolated compartments for the retention of liquids.*

*10. A tray for the bottom of a casket comprising a sheet of plastic material having:*

*a bottom wall,*

*longitudinal side walls connected to said bottom wall, and*

*transverse end walls connected to said bottom wall and said side walls,*

*said bottom wall having a plurality of interconnected upstanding ribs forming a plurality of discrete isolated compartments for the retention of liquids,*

*the longitudinal dimension of the compartments being so related to the height of the ribs to permit a casket having a given depth of liquid in the bottom to have one end raised up with respect to the other end without overflowing by an amount greater than would be possible in the absence of said ribs.*

*11. A tray for the bottom of a casket comprising a sheet of plastic material having:*

*a bottom wall,*

*longitudinal side walls connected to said bottom wall, and*

*transverse end walls connected to said bottom wall and said side walls,*

*said bottom wall having a plurality of interconnected upstanding ribs forming a plurality of discrete isolated compartments for the retention of liquids,*

*the longitudinal dimension of the compartments being so related to the height of the ribs to permit a casket when one end is raised up with respect to the other end by a given amount to contain in the bottom of the casket a greater depth of liquid without overflowing than would be possible in the absence of said ribs.*

*12. A tray for the bottom of a casket comprising a sheet of plastic material having:*

*a bottom wall,*

*longitudinal side walls connected to said bottom wall, and*

*transverse end walls connected to said bottom wall and said side walls,*

*said bottom wall having a plurality of interconnected upstanding ribs forming a plurality of discrete isolated compartments for the retention of liquids,*

*the longitudinal dimension of the compartments being so related to the height of the ribs to permit a casket having liquid in the bottom to have one end raised up with respect to the other end without the liquid flowing from the one end to the other end.*

* * * * *

UNITED STATES PATENT AND TRADEMARK OFFICE

CERTIFICATE OF CORRECTION

PATENT NO. : Re. 34,846

DATED : February 7, 1995

INVENTOR(S) : Keith D. MaGuire

It is certified that error appears in the above-indentified patent and that said Letters Patent is hereby corrected as shown below: On the title page, item [75], the inventor's name is mispelled. It should be -- Keith D. MaGuire --.

Col. 3, line 13, the word "inches" should be deleted.

Col. 3, line 35, "to conveniently" should be -- to be conveniently --.

Col. 3, line 66, "53" should be -- 55 --.

Col. 4, line 12, insert a comma after "wall".

Col. 4, line 23, "3020" should be -- 30° --.

Col. 4, line 56, "3020" should be -- 30° --.

Signed and Sealed this

Nineteenth Day of September, 1995

*Attest:*

*Attesting Officer*

Bruce Lehman

BRUCE LEHMAN

*Commissioner of Patents and Trademarks*